United States Patent Office 3,074,926
Patented Jan. 22, 1963

3,074,926
AZO DYES FOR ACRYLIC AND POLYESTER FIBERS
Mario Francesco Sartori, Wilmington, Del., assignor to E. I. du Pont de Nemours and Company, Wilmington, Del., a corporation of Delaware
No Drawing. Filed May 25, 1959, Ser. No. 815,298
5 Claims. (Cl. 260—191)

This invention relates to novel water-soluble, organic compounds which are useful as dyes for acid-modified acrylic and polyester fibers. By acrylic fiber or acid-modified acrylic fiber, throughout this specification and claims, I mean acrylic fiber having acid sites; for instance, the sulfonate-modified acrylic fibers described in U.S. Patents 2,837,500 and 2,837,501. By acid-modified polyester fiber, I mean polyethylene terephthalate fiber containing metal-sulfonate groups, as described more fully in Belgian Patent No. 549,179, granted July 14, 1957.

It is an object of this invention to provide novel cationic azo dyes useful for dyeing the aforementioned fibers, but which are particularly characterized by proton stability of shade. By the latter term I mean that the shade of the dyeing on the aforementioned fibers does not change perceptibly with change of H-ion concentration in the acid dye bath employed. Other objects and achievements of this invention will become apparent as the description proceeds.

Water-soluble, cationic azo dyes as a class are not new. In U.S. Patent 2,821,526 (issued to Samuel N. Boyd, Jr.), compounds of this general class are set forth which may be expressed by the general formula

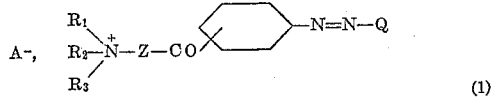

(1)

Full details as to the symbols involved may be found in the patent, but at this point it may suffice to say, by way of summary, that $R_1$, $R_2$ and $R_3$ represent alkyl or substituted alkyl groups; $A^-$ is the anion of a water-soluble acid; the group —Z—CO— represents a short-chain aliphatic acyl radical; the benzene ring shown may contain substituents common in azo dye components, for instance lower alkyl, chlorine, bromine or alkoxy; and Q is a final component, which is defined in said patent by the group

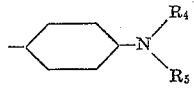

wherein the phenyl nucleus again may contain substituents as are common in azo components, while $R_4$ and $R_5$ may represent hydrogen, lower alkyl, hydroxyalkyl, acetoethyl, cyanoethyl or phenyl.

The said cationic azo compounds have been indicated in said patent as useful for rapid and direct dyeing of acrylic fiber or union fabrics containing such fiber. The dyeings thus obtained were yellow-orange to red-violet in shade and were found there to possess good wash-fastness and light-fastness.

The patent, however, admitted one weakness in said colors, namely: They possess the properties of indicators, and the shade of dyeing obtained with the same compound will generally vary from more (or less) yellow to more (or less) red depending on the hydrogen-ion concentration of the acid dye bath employed. Such variability of the dyeings is generally spoken of as lack of proton stability of shade.

I have now found that hydrolytically stable, water-soluble, cationic azo dyes of excellent proton stability, in addition to having good light-fastness and wash-fastness qualities and other valuable properties, can be obtained if for the final component Q in the above general formula is chosen a beta-naphthylamine having the 1-position free or occupied only by a sulfonic acid group, typical illustrations being beta-naphthylamine itself, N-methyl-2-naphthylamine, N-hydroxyethyl-2-naphthylamine, N-phenyl-2-naphthylamine, 2-amino-1-naphthalene sulfonic acid, or nuclear substitution derivatives of any of these, the substituents being members of the group consisting of alkyl, alkoxy, chlorine and bromine, all alkyl, hydroxyalkyl and alkoxy members referred to herein being radicals of 1 to 4 C-atoms. It will be noted that all the aforegoing 2-naphthylamines will couple in the 1-position (the $SO_3H$ group in the 1-position, if there is any, being eliminated in the coupling process), and that the radical Q thus introduced is free of ionizable and hydroxy groups except the amino group in the 2-position. Furthermore, the naphthylamine compound may be a disazo compound formed by interposing an extra phenyl-azo group between the azo bridge and member Q in Formula 1 above, without affecting the proton stability of the compound.

Accordingly, my present invention contemplates a series of novel compounds of the general formulas

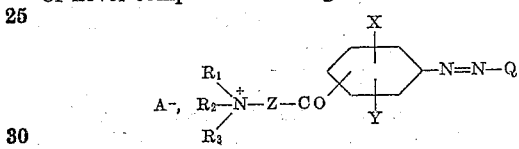

and

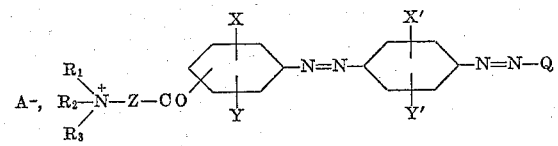

wherein Q is the coupling radical of a beta-naphthylamine, X and Y are members of the group consisting of hydrogen, alkyl, chlorine and bromine, X' and Y' are members of the group consisting of hydrogen, alkyl, alkoxy, chlorine and bromine, said alkyl and alkoxy members being radicals of 1 to 4 C-atoms, Z is an alkylene radical having from 1 to 3 C-atoms, $R_1$ is an alkyl radical, $R_2$ is a radical of the group consisting of alkyl and hydroxyalkyl, $R_3$ is a radical of the group consisting of alkyl, hydroxyalkyl and benzyl, said alkyl and hydroxyalkyl members being radicals of 1 to 4 C-atoms, and $A^-$ is a water-solubilizing anion such as chloride, bromide, sulfate, phosphate, acetate or p-toluenesulfonate.

Apart from the above difference as to structure, my novel monoazo compounds may be prepared by the same general procedure as the compounds in said Boyd patent. For instance, the monoazo compounds may be prepared by diazotizing in conventional manner a monoquaternary diamine of the formula

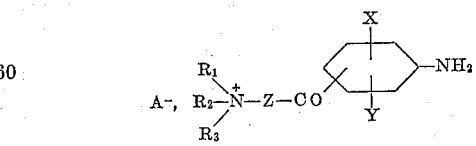

wherein X, Y, Z, $R_1$, $R_2$ and $R_3$ have the same significance as above, while $A^-$ is the anion of a strong mineral acid (such as hydrochloric or sulfuric acid), and coupling the obtained diazo compound, in acid aqueous medium and at or below room temperature (say 20° to 5° C.) to a beta-naphthylamine compound of form Q as above defined. In the cases where a disazo compound is desired, the same may be prepared by coupling the diazo compound obtained as above to a compound of the formula

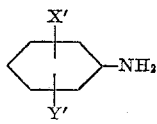

(as defined above), then diazotizing again and coupling as above to a beta-naphthylamine of form Q, as above defined.

The final monoazo or disazo dye thus produced, which is sparingly soluble in cold water, may be recovered directly by filtration. The requisite initial monoquaternary diamine may be prepared as in Examples IX, XI, XII, XIV(a) and XV(a) of said Boyd patent.

Application of the novel dyes to acrylic or acid-modified polyester fiber may be made from an acid aqueous bath at about pH 4 to 5, at customary dyeing temperatures (180° to 212° F.). Application to union fabrics containing one of the above synthetic fibers and wool is carried out advantageously at 212° F. in a dye bath containing about 2% (by weight of the fiber) of glacial acetic acid, 2% of sodium acetate and 2% of a non-ionic surface active agent, such as Emulphor ON (a condensation product of oleyl alcohol or cetyl alcohol with ethylene oxide). The dyeings thus obtained are bright, fast, hydrolytically stable, shade stable, and they build up to heavy shades on these fibers.

Without limiting this invention, the following examples are given to illustrate my preferred mode of operation. Parts mentioned are by weight.

*Example 1*

22.8 parts of (p-aminophenacyl)trimethylammonium chloride (Example IX of U.S. Patent 2,821,526) are diazotized in usual manner, and stirred gradually into a solution containing 14.3 parts of 2-naphthylamine and 15 parts of 36% hydrochloric acid in 200 parts of water. During the addition the reaction mixture is maintained at 5° to 10° C. and the pH kept at 5 by addition of sodium acetate. The slurry is stirred at 5° to 10° C., for 8 hours, then at room temperature for 8 hours. The precipitate is then filtered off, washed with 10% sodium chloride aqueous solution, and dried. The new dye has the structure

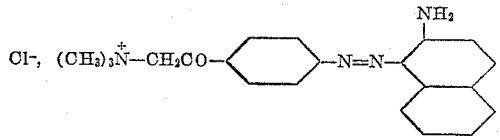

It is a red powder, which dissolves in water to give a red-scarlet solution. The absorption maximum in ethanol is located at 500 millimicrons. It dyes acrylic fiber in bright scarlet shades of good fastness properties. The shades remain unchanged when the acidity of the dye bath is varied from pH 2 to pH 9.

When the (p-aminophenacyl)trimethylammonium chloride of this example is replaced with 24 parts of [2-(p-aminobenzoyl)ethyl]trimethylammonium chloride (prepared as described in Example XIV(a) of U.S. Patent 2,821,526) one obtains a similar red dye for acrylic fiber. Likewise, when the p-aminophenacyl compound of this example is replaced with 34 parts of [3-(p-aminobenzoyl)propyl]triethylammonium bromide (prepared by the method of H. W. Linnell and S. V. Vora, Journal of Pharmacy and Pharmacology, vol. 4, No. 1, pages 62–64, 1952), or with 24 parts of (4'-amino-2-methylphenacyl)trimethylammonium chloride (prepared as described in Example XV(a) of U.S. Patent 2,821,526) products are obtained which dye acrylic fiber red shades.

*Example 2*

An aqueous solution of diazotized (p-aminophenacyl)trimethylammonium chloride, prepared as described in Example 1, is added during about 30 minutes to a stirred mixture containing 22.3 parts of 2-amino-1-naphthalenesulfonic acid, 22.3 parts of sodium acetate and 60 parts of 36% hydrochloric acid in 300 parts of water, while maintaining the temperature at 15° to 20° C. The reaction mass is then stirred at 20° to 30° C. for 24 hours. The precipitate is filtered off and slurried at 60° C. in a solution of 15 parts of acetic acid and 150 parts of water. After 15 minutes at 60° C. the slurry is filtered and the filtrate salted with 10% by weight of sodium chloride. The precipitate is filtered off, washed with 10% sodium chloride solution and dried. This dye has the same formula as the dye of Example 1 and dyes acrylic fiber in bright scarlet shades.

When the 2-amino-1-naphthalenesulfonic acid of Example 2 is substituted by an equivalent amount of N-(2-hydroxyethyl)-2-naphthylamine, N-methyl-2-naphthylamine, or N-phenyl-2-naphthylamine one obtains compounds which dye acrylic fiber red shades of good fastness properties.

*Example 3*

A solution of 30 parts of (p-acetamidophenacyl)dimethyl(2-hydroxyethyl)ammonium chloride in 300 parts of water and 70 parts of 36% hydrochloric acid is heated at boiling temperature for 0.5 hour, iced to 0° C. and diazotized by the addition of 6.9 parts of sodium nitrite. An excess of nitrous acid is maintained in the solution for 30 minutes and is then decomposed by the addition of a small amount of sulfamic acid. This diazo solution is then coupled to 2-naphthylamine as described in Example 1. The new dye is a red powder of the formula

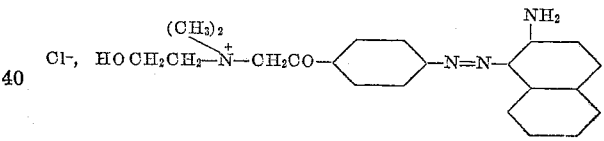

It dyes acrylic fibers scarlet shades of good fastness properties.

This dye may be obtained also by coupling the diazo solution of this example with 2-amino-1-naphthalenesulfonic acid, by following the procedure described in Example 2.

*Example 4*

22.8 parts of (p-aminophenacyl)trimethylammonium chloride are diazotized in usual manner, and stirred gradually into a solution of 10.8 parts of m-toluidine in 5% aqueous hydrochloric acid. This is followed by the addition of sodium acetate to keep the pH at 1 to 2. The mixture is then stirred at 10° C. for 5 hours and at room temperature for 8 hours, salted with 10% by weight of sodium chloride, and filtered; the residue is washed with 10% by weight of sodium chloride aqueous solution.

The orange cake is then dissolved in 1000 parts of water and 50 parts of 36% hydrochloric acid and rediazotized in customary manner with 6.9 parts of sodium nitrite. After decomposing any excess nitrous acid by the aid of sulfamic acid, the resulting solution is added to a stirred solution of 14.3 parts of 2-naphthylamine in 15 parts of 36% hydrochloric acid in 200 parts of water. The coupling of the reactants and the isolation of the dye are done as described in Example 1.

The new dye has the formula

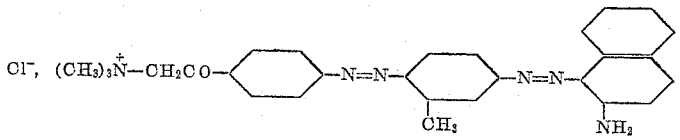

It is a dark powder, soluble in dilute acid. It dyes acrylic fiber violet-red shades of good fastness properties.

The same dye is obtained when 2-naphthylamine is replaced by an equivalent amount of 2-amino-1-naphthalenesulfonic acid.

*Example 5*

Replacement in Example 4 of the m-toluidine with an equivalent amount of 5-methyl-o-anisidine gives a product, which dyes acrylic fiber in violet shades of goodfastness properties.

This dye has the formula

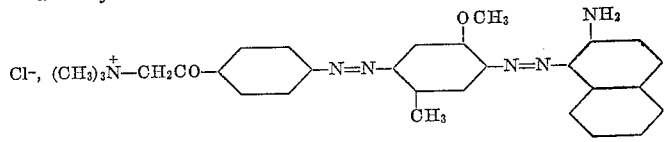

The m-toluidine in Example 4 may also be replaced by 2,5-dichloroaniline to provide a violet-red dye with good fastness properties.

My novel dyes are applicable to the aforementioned fibers by standard procedure, of which the following two are typical.

(1) *Dyeing of acrylic fiber.*—100 parts of acrylic fiber as a woven fabric is pre-scoured at 70° C. for 15 minutes in 4000 parts of water and 1 part of a non-ionic dispersing agent. The fabric is rinsed and then boiled for 2 hours in a dye bath consisting of 1 part of glacial acetic acid, 0.25 part of the dye, 0.3 part of sodium acetate and 4000 parts of water. The fabric is then rinsed in warm water and scoured as before. Finally, the fabric is rinsed, dried and pressed.

(2) *Dyeing of polyester fiber.*—To 300 parts water, add 0.2 part of the condensation product of 20 moles of ethylene oxide and one mole of oleyl alcohol, 0.6 part of a long-chain hydrocarbon sodium sulfonate and 2 parts of the sodium salt of o-phenylphenol. Add water to adjust the volume to about 390 parts. Adjust the pH to 5.5 by adding 10% acetic acid. Add 0.025 part of dye and 10 parts of polyester staple fiber. Add water to bring the dye bath volume to 400 parts, heat the dye bath to the boil and boil for 2 hours. Then rinse the fiber in water, scour it by heating for 30 minutes at 80° C. in an aqueous bath containing 0.5 gram per liter each of the following: NaOH, cetyl betaine and sodium hydrosulfite. Again rinse the fiber in water and dry it. Then heat-treat this dyed fiber for 1 minute at 190° C.

The novel dyes of this invention undergo no change in shade when applied to the fiber from a dye bath in which the pH is varied from pH 9 to pH 2. This constancy of the shade is highly desirable, particularly when dyeing fabrics composed of mixtures of the acrylic fiber and wool, and is in marked contrast to the variable shade that results from a pH change of the dye bath when the dye is made with 1-naphthylamine or its substituted derivatives. Dyeings from the dye prepared from 1-naphthylamine, for example, are red-violet when made from a dye bath at pH 4.5; at pH 7 to 9 and at pH 3 the dyeings are noticeably yellower and weaker.

It will be understood that the details of the above examples can be varied widely without departing from the spirit of this invention. Thus, the aforegoing examples utilize the chloride salts of the cationic dyes, but other salts may be employed, inasmuch as the anion in the dye is not critical so long as it renders the dye soluble in water. Other anions may have their origin in other phenacyl derivatives such as p-aminophenacyl bromide which reacts with a tertiary amine to form the quaternary phenacylammonium bromide. Other anions may also arise by subjecting the phenacylammonium chloride or the dyes prepared from them to the usual metathetical reactions. For instance, hydrolysis of the (p-acetamidophenacyl)dimethyl(2-hydroxyethyl)ammonium chloride as described in Example 3 may be done with 5 to 10 parts of 4 N sulfuric or phosphoric acid in place of the hydrochloric acid. The resulting solutions of the (p-aminophenacyl)dimethyl(2-hydroxyethyl)ammonium sulfates or phosphates can be treated directly with sodium nitrate to effect diazotization of the primary aromatic amines.

Other phenacyl intermediates than those cited in the examples may be used, and each of these may be used in combination with any other of the components falling within the scope of the general formula above set forth.

In particular, the following additional phenacyl quaternary salts are named as suitable examples:

(3'-amino-4'-methylphenacyl)trimethylammonium chloride, (4' - amino-3'-chlorophenacyl)dimethylbenzylammonium sulfate, (4' - amino-2',5'-dimethylphenacyl)dimethyl(2-hydroxyethyl)ammonium phosphate, (4' - amino - 3',5'-dibromophenacyl)trimethylammonium chloride,

[2-(p-aminobenzoyl)ethyl]trimethylammonium chloride,

[3-(p-aminobenzoyl)propyl]triethylammonium bromide, or (4'-amino-2'-methylphenacyl)trimethylammonium chloride.

In lieu of the 2-naphthylamines named in the examples, any of the following may be used in this invention:

4-bromo-2-naphthylamine,
6-bromo-2-naphthylamine,
4-chloro-2-naphthylamine,
4-methyl-2-naphthylamine,
5-methyl-2-naphthylamine,
5-methoxy-2-naphthylamine,
6-methoxy-2-naphthylamine.

The 1-position of 2-naphthylamine should be free or occupied only by a sulfonic acid group to permit coupling in this position.

Many other variations in detail will be readily apparent to those skilled in the art.

The advantages of this invention will now be readily apparent. My novel compounds possess a combination of useful properties, including water-solubility, hydrolytic and proton stability, good build-up, good brightness, carbonization fastness and remarkable light-fastness properties.

Hydrolytic stability implies that the dye is not decomposed by water, whether in acid, neutral or alkaline bath.

The significance of carbonization fastness will become apparent from the following mode of testing for the same. The test is applied to a union fabric comprising wool and acrylic or acid-modified polyester fiber, and consists essentially of a hot treatment of the fabric with sulfuric acid of about 3% concentration for the purpose of removing extraneous matter from the wool. The wool in the mixed goods is first dyed with a so-called neutral dyeing color such as a 1:2 metallized azo dye. Then the mixed goods are dyed with a cationic dye (for instance the novel compounds of this application), to color the acid-modified polyester or acrylic fiber present. If the cationic dye has poor proton stability, its true shade is altered considerably as a result of the low pH reached in the subsequent carbonization treatment. Some cationic dyes recover their true shade upon neutralization of the carbonized and dyed fabric. Others are poor in their shade recovery. Shade stability or sensitivity to the acid before neutralization is also important. The dyes of this invention pass both tests quite well, i.e., there is no shade change in dye baths at low pH, and the very small shift in shade caused by the carbonization treatment is completely recovered in the neutralization step.

I claim as my invention:

1. A compound of the group represented by the formulas

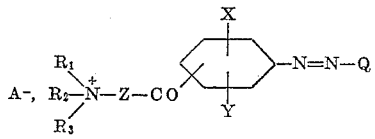

and

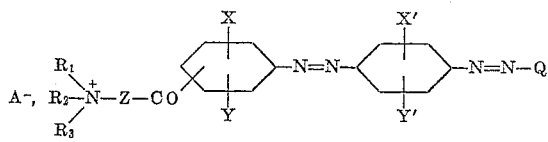

wherein X and Y are members of the group consisting of hydrogen, alkyl, chlorine and bromine, X' and Y' are members of the group consisting of hydrogen, alkyl, alkoxy, chlorine and bromine, said alkyl and alkoxy members being radicals of 1 to 4 C-atoms and said members X' and Y' being situated para to each other when neither of them represents hydrogen, Z is an alkylene radical having from 1 to 3 C-atoms, $R_1$ is an alkyl radical, $R_2$ is a radical of the group consisting of alkyl and hydroxyalkyl, $R_3$ is a radical of the group consisting of alkyl, hydroxyalkyl and benzyl, $A^-$ is a water-solubilizing anion, and Q is a beta-naphthylamine radical of the formula

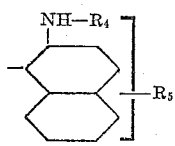

wherein $R_4$ is a member of the group consisting of hydrogen, alkyl, hydroxyalkyl and phenyl and $R_5$ is a member of the group consisting of hydrogen, alkyl, alkoxy, chlorine and bromine, all alkyl, hydroxyalkyl and alkoxy members in this claim being radicals of 1 to 4 C-atoms, and the CO group in each of the above formulas being attached in one of the positions 3, 4 and 5 with respect to the azo bridge.

2. A compound of the formula

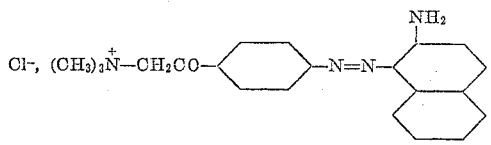

3. A compound of the formula

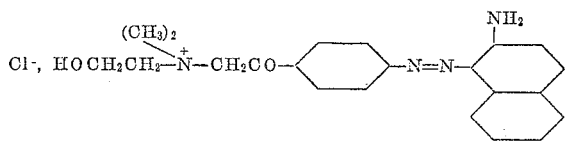

4. A compound of the formula

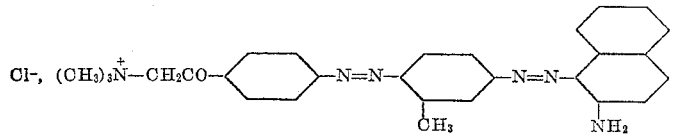

5. A compound of the formula

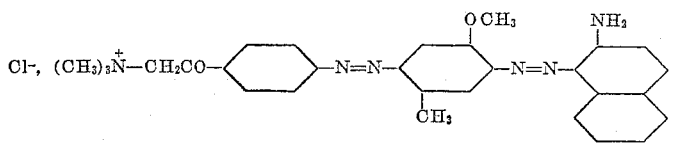

References Cited in the file of this patent

UNITED STATES PATENTS

| | | |
|---|---|---|
| 610,345 | Deicke | Sept. 6, 1898 |
| 2,764,466 | Bidgood | Sept. 25, 1956 |
| 2,772,943 | Hiller | Dec. 4, 1956 |
| 2,821,526 | Boyd | Jan. 28, 1958 |
| 2,832,764 | Huenig | April 29, 1958 |
| 2,864,812 | Bossard | Dec. 16, 1958 |
| 2,913,303 | Baumann | Nov. 17, 1959 |

FOREIGN PATENTS

| | | |
|---|---|---|
| 22,572 | Great Britain | 1892 |
| 98,585 | Germany | July 8, 1898 |

OTHER REFERENCES

Colour Index, second ed. 1956, Soc. of Dyers & Colourists, vol. 1, p. 1623, Entray Cl–11270.

Ibid., vol. 3, p. 3018, Entry Cl–11270.